(12) United States Patent
McFeeters et al.

(10) Patent No.: US 11,879,591 B2
(45) Date of Patent: Jan. 23, 2024

(54) STEAM TRAP

(71) Applicant: Thermal Impact Group Ltd., Ballyclare (GB)

(72) Inventors: Kenneth McFeeters, Newtownards (GB); John Metson, Ballyclare (GB)

(73) Assignee: Thermal Impact Group Ltd., Doagh (GB)

( * ) Notice: Subject to any disclaimer, the term of this patent is extended or adjusted under 35 U.S.C. 154(b) by 0 days.

(21) Appl. No.: 17/788,182

(22) PCT Filed: Dec. 22, 2020

(86) PCT No.: PCT/EP2020/087671
§ 371 (c)(1),
(2) Date: Jun. 22, 2022

(87) PCT Pub. No.: WO2021/130249
PCT Pub. Date: Jul. 1, 2021

(65) Prior Publication Data
US 2023/0045874 A1 Feb. 16, 2023

(30) Foreign Application Priority Data
Dec. 23, 2019 (GB) .................................. 1919135

(51) Int. Cl.
*F16T 1/34* (2006.01)
*F16T 1/16* (2006.01)

(52) U.S. Cl.
CPC . *F16T 1/34* (2013.01); *F16T 1/16* (2013.01)

(58) Field of Classification Search
CPC .. F16T 1/34; F16T 1/16; Y10T 137/3003–308

USPC ................ 137/177–196, 203, 549, 204, 334, 137/888–890, 896; 138/37–46; 236/52–60

See application file for complete search history.

(56) References Cited

U.S. PATENT DOCUMENTS

| | | | | |
|---|---|---|---|---|
| 1,163,316 | A | * 12/1915 | Brown | .................... F16K 3/188 236/59 |
| 1,662,185 | A | * 3/1928 | Garcia | ...................... F16T 1/34 137/177 |
| 1,697,343 | A | * 1/1929 | Campbell | ................. F16T 1/34 137/880 |

(Continued)

FOREIGN PATENT DOCUMENTS

| | | |
|---|---|---|
| EP | 3572709 | 11/2019 |
| WO | 2019008947 | 1/2019 |

OTHER PUBLICATIONS

International Search Report of corresponding PCT Application No. PCT/EP2020/087671, dated Mar. 29, 2021.

*Primary Examiner* — Craig J Price
(74) *Attorney, Agent, or Firm* — Gardner, Linn, Burkhart & Ondersma LLP

(57) ABSTRACT

A steam trap includes a body having a flow passageway therethrough between an inlet connectable to a steam pipeline and an outlet connectable to a condensate drain line. The flow passageway has a first flow restriction defined by a first venturi orifice to pass condensate therethrough while restricting the flow of live steam, and a second flow restriction, downstream of the first flow restriction. The second flow restriction is adapted to allow condensate flow therethrough while restricting the flow of flash steam.

12 Claims, 6 Drawing Sheets

(56) References Cited

U.S. PATENT DOCUMENTS

| | | | | |
|---|---|---|---|---|
| 2,074,690 A | * | 3/1937 | Gerdts | F16T 1/34 |
| | | | | 138/44 |
| 2,804,168 A | * | 8/1957 | Church | B01D 46/48 |
| | | | | 55/324 |
| 2,989,976 A | | 6/1961 | Kinderman et al. | |
| 3,084,634 A | * | 4/1963 | McDougall | B01F 25/31242 |
| | | | | 417/163 |
| 3,147,920 A | * | 9/1964 | McCormack, Jr. | F16T 1/10 |
| | | | | 137/190 |
| 3,211,376 A | * | 10/1965 | McCormack, Jr. | |
| | | | | B01D 19/0063 |
| | | | | 137/190 |
| 3,874,405 A | * | 4/1975 | Thayer | F15B 13/0438 |
| | | | | 137/625.62 |
| 3,893,473 A | | 7/1975 | Breece | |
| 4,210,166 A | * | 7/1980 | Munie | B01F 25/4335 |
| | | | | 137/271 |
| 4,282,637 A | * | 8/1981 | Mosseri | D02G 1/161 |
| | | | | 28/273 |
| 4,592,381 A | * | 6/1986 | Troy | F16T 1/34 |
| | | | | 137/203 |
| 6,283,833 B1 | * | 9/2001 | Pao | B24C 5/04 |
| | | | | 451/39 |
| 6,523,991 B1 | * | 2/2003 | Maklad | B01F 25/31242 |
| | | | | 137/890 |
| 6,974,279 B2 | * | 12/2005 | Morohashi | B65G 53/14 |
| | | | | 406/173 |
| 8,464,747 B2 | * | 6/2013 | Gooding | B01D 53/265 |
| | | | | 137/187 |
| 2009/0044868 A1 | | 2/2009 | Chiang | |
| 2010/0150743 A1 | * | 6/2010 | Dellach | B66C 1/0212 |
| | | | | 417/182 |

\* cited by examiner

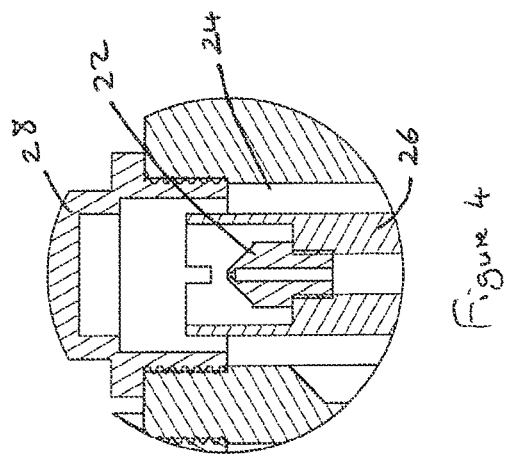
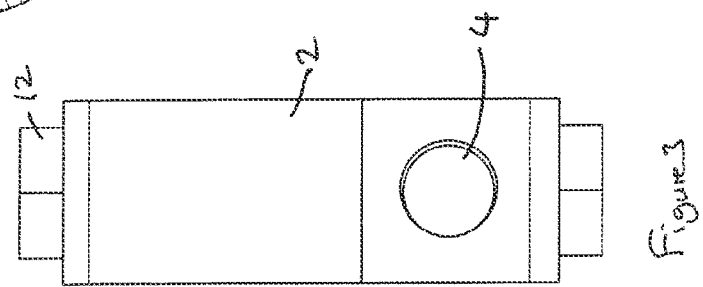
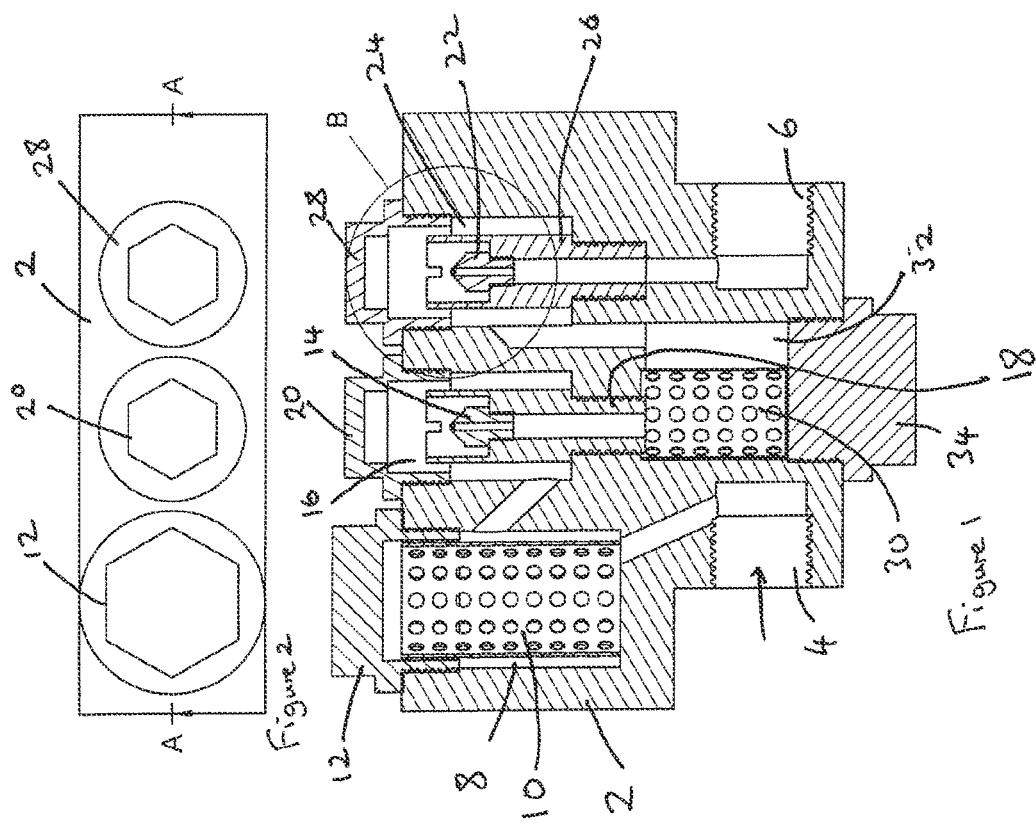

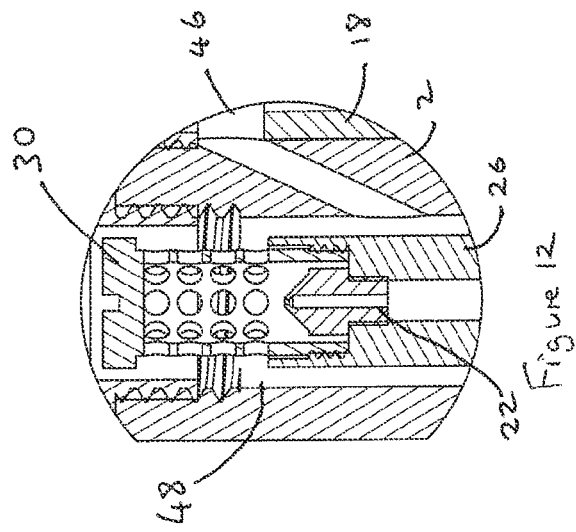
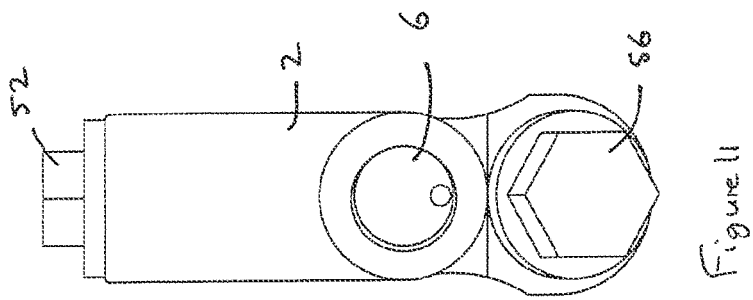
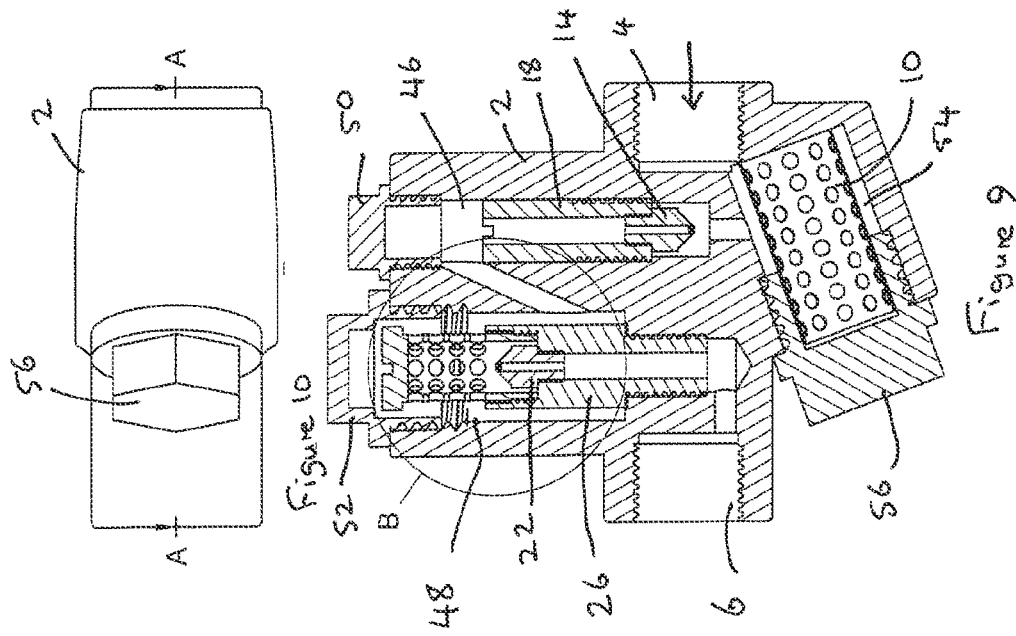

STEAM TRAP

CROSS REFERENCE TO RELATED APPLICATIONS

The present application is a § 371 national stage of International Application PCT/EP2020/087671, filed Dec. 22, 2020, which claims priority benefit to U.K. Pat. Application Ser. No. 1919135.2, filed Dec. 23, 2019, both of which are hereby incorporated herein by reference in their entireties.

FIELD OF THE INVENTION

This invention relates to a steam trap for removing condensate from a steam line of a steam plant and, in particular, to a venturi orifice steam trap.

BACKGROUND OF THE INVENTION

Steam plants are commonly used for generating and distributing useful energy, in the form of steam, to the point of use in various industrial applications.

The presence of excessive condensate (condensed steam) in a steam line of a steam plant is undesirable because it acts as a barrier to heat transfer and can lead to damaging cavitation and water hammer effects, and lead to corrosion of the steam lines and other components coupled thereto. It is therefore necessary to remove condensate from the steam lines. To achieve this, condensate is typically drained from the lowest points of the main plant steam line through one or more condensate drain lines. In order to limit steam loss from the plant, the (or each) condensate drain line is provided with a respective steam trap, which ideally operates to drain condensate whilst at the same time preventing the escape of "live" steam.

The main function of a steam trap is to drain condensate from a steam line to which the trap is connected. However, it is also desirable to discharge air and other non-condensable gases which may collect in the steam line. For example, when steam is first turned on to a cold plant, there is usually a considerable volume of air which should be purged out as quickly as possible so as to quickly raise the plant to the desired operating temperature.

Whilst the presence of condensate in a steam line of a steam plant is undesirable, the hot condensate will nevertheless contain useful energy and therefore in a typical steam plant the condensate drain lines and steam traps will form part of a larger condensate recovery system designed to drain condensate (but ideally not live steam) from the main plant and to collect and recycle the drained condensate, for example into a downstream boiler for subsequent use in the plant. Therefore, the (or each) condensate drain line will typically feed into one or more downstream receiver tanks.

Conventional steam traps are typically mechanical devices which are normally closed to prevent steam loss and which open automatically to discharge condensate under certain conditions. For example, a float valve type trap operates by sensing the difference in density between steam and condensate. Condensate reaching the trap will cause the float to rise, lifting the valve off its seat to an open position thereby releasing condensate into a condensate drain line.

However, such mechanical traps are not well suited to operation over varying pressure ranges and are prone to mechanical failure. If a mechanical steam trap fails open, live steam is lost from the system. This is inefficient, wasteful and can pressurise condensate recovery lines. Should a mechanical steam trap fail closed, the condensate can back up causing water hammer and, if not detected quickly, can cause catastrophic failure of the steam plant. It is therefore considered best practice for sites to have an annual steam trap survey where mechanical stream traps are used to determine failures and replace any failed traps. Mechanical steam traps can also result in a significant loss of live steam even when operating correctly.

An alternative type of steam trap, known as a venturi orifice trap, can solve some of these problems by avoiding the need for moving parts. In an orifice steam trap, condensate is forced through a carefully sized small orifice in a venturi nozzle by the steam pressure. Thus while the condensate passes into the condensate system, it obstructs the passage of steam thereby minimising the loss of steam. Typically condensate passing through the orifice of the venturi nozzle enters a channel that opens out (e.g. flares outwardly) in the direction of flow. The pressure drop in the venturi nozzle downstream of the orifice causes flash steam to form from the saturated condensate, whereby the restriction caused by the flash steam is understood to regulate the condensate flow through the orifice.

However, such known venturi orifice steam traps still result in the release of flash steam into the condensate return line, which causes a loss of energy and can lead to problems in condensate recovery system. The greater the pressure drop across the venturi orifice trap, the greater the percentage of flash steam produced.

SUMMARY OF THE INVENTION

The improved steam trap of the present invention addresses deficiencies with existing traps. According to a first aspect of the present invention, there is provided a steam trap comprising a body having a flow passageway therethrough between an inlet connectable to a steam pipeline and an outlet connectable to a condensate drain line, the flow passageway comprising a first flow restriction defined by a first venturi orifice to pass condensate therethrough while restricting the flow of live steam, and a second flow restriction, downstream of the first flow restriction, the second flow restriction being adapted to allow condensate flow therethrough while restricting the flow of flash steam.

In one embodiment the second flow restriction may comprise a second venturi orifice. Optionally, the second venturi orifice has a different orifice size than the first venturi orifice. In one embodiment the second venturi orifice has a larger size than the first venturi orifice. The first and second venturi orifices may be arranged orthogonally to one another. Alternatively first and second venturi orifices may be arranged substantially parallel to one another with the condensate travelling through them in series Optionally, the first and second flow restrictions are defined in removable inserts adapted to be removed from the body of the steam trap for cleaning and/or replacement. The body may include one or more removable caps or covers permitting access to the respective first and second flow restrictions to permit removal thereof.

A first strainer may be provided in the flow passageway upstream of the first flow restriction for removing solid contamination from the steam. A second strainer may be provided in the flow passageway downstream of the first flow restriction and upstream of the second flow restriction. The first and/or second strainers may be removable from the body of the steam trap for cleaning. The body of the steam trap may include one or more removable caps or covers permitting access to the respective first and second strainers to permit removal thereof.

A spray nozzle may be provided in the flow passageway downstream of the second flow restriction for atomising condensate passing therethrough. The spray nozzle may be provided in or adjacent the outlet of the flow passageway.

One or more further flow restrictions, such as one or more venturi orifices, may be provided in the flow passageway downstream of the second flow restriction.

These and other objects, advantages and features of the invention will become apparent upon review of the following specification in conjunction with the drawings.

BRIEF DESCRIPTION OF THE DRAWINGS

A steam trap in accordance with various embodiments of the present invention will now be described, by way of example only, with reference to the accompanying drawings, in which:—

FIG. 1 is a longitudinal sectional view through a steam trap in accordance with a first embodiment of the present invention;

FIG. 2 is a plan view of the steam trap of FIG. 1;

FIG. 3 is an end view of the steam trap of FIG. 1;

FIG. 4 is a detailed view of part B of the steam trap of FIG. 1;

FIG. 9 is a longitudinal sectional view through a steam trap in accordance with a third embodiment of the present invention;

FIG. 10 is a bottom view of the steam trap of FIG. 9;

FIG. 11 is an end view of the steam trap of FIG. 9;

FIG. 12 is a detailed view of part B of the steam trap of FIG. 9;

DETAILED DESCRIPTION OF THE PREFERRED EMBODIMENTS

Figure 8:
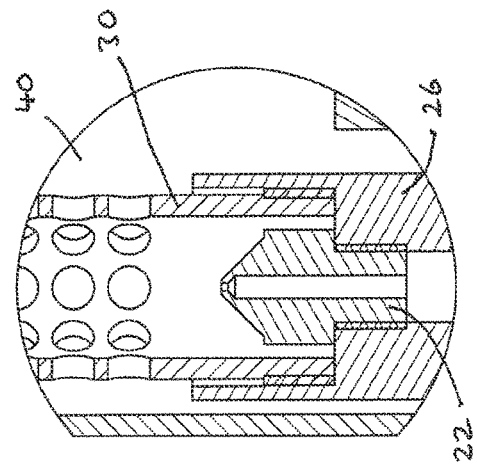
FIG. 8 is a detailed view of part B of the steam trap of FIG. 5.
Figure 7:
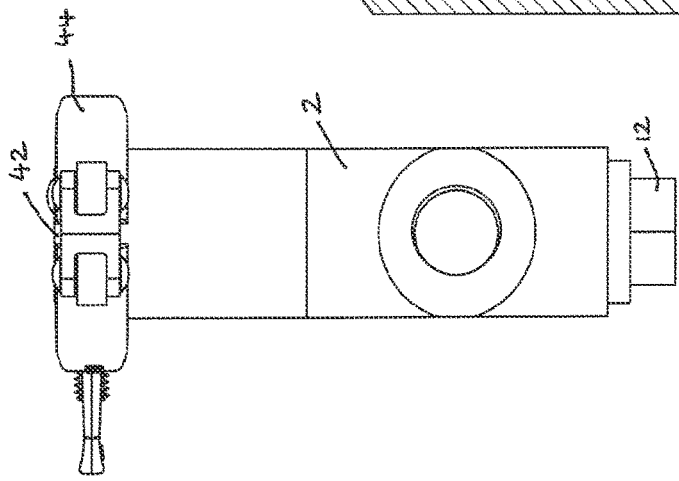
FIG. 7 is an end view of the steam trap of FIG. 5 showing hidden detail.
Figure 5:
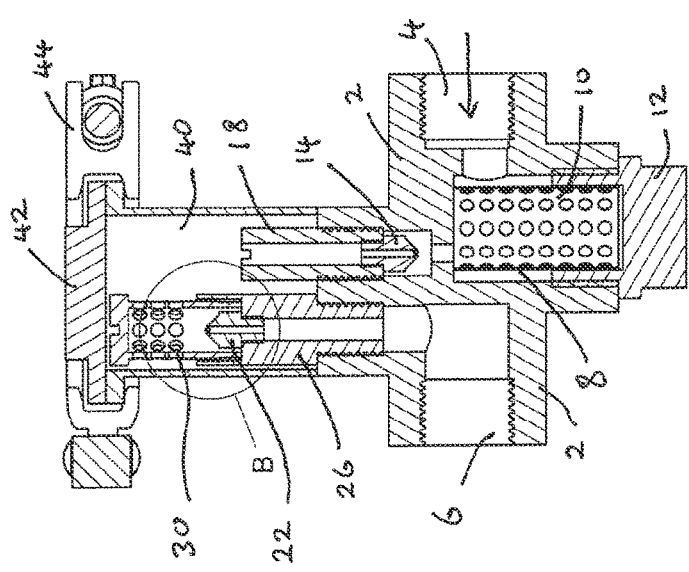
FIG. 5 is a longitudinal sectional view through a steam trap in accordance with a second embodiment of the present invention.
Figure 6:
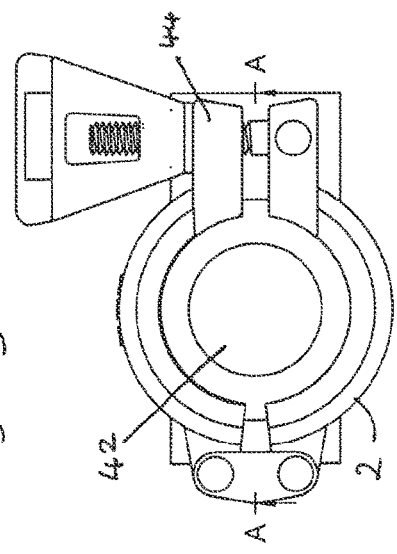
FIG. 6 is a plan view of the steam trap of FIG. 5.
Figure 16:
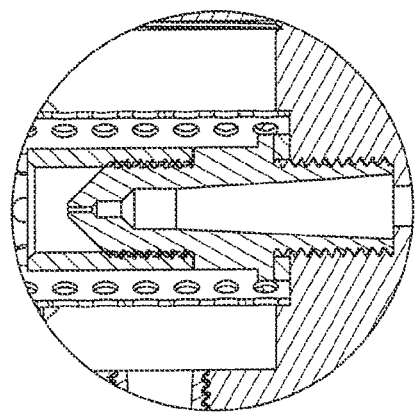
FIG. 16 is a detailed view of part B of the steam trap of FIG. 13.
Figure 15:
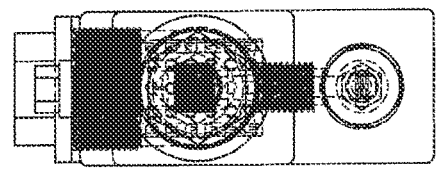
FIG. 15 is an end view of the steam trap of FIG. 13.
Figure 14:
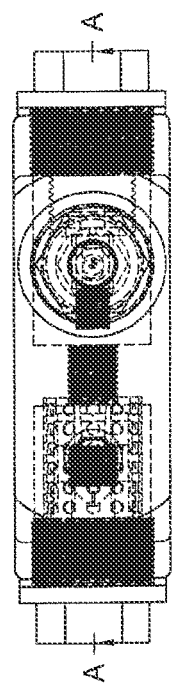
FIG. 14 is a plan view of a cross section of the steam trap of FIG. 13.
Figure 13:
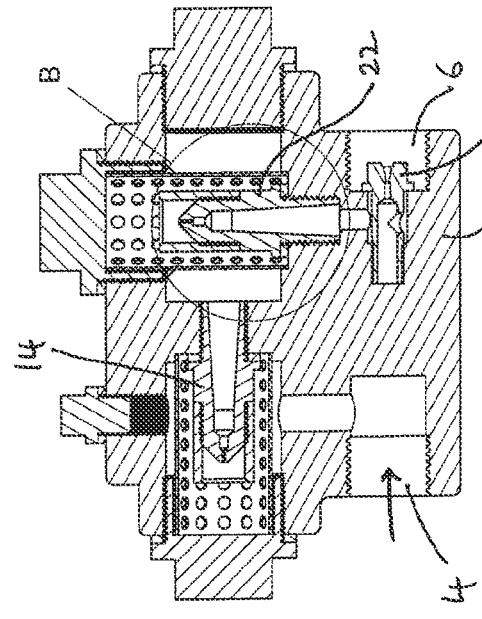
FIG. 13 is a longitudinal sectional view through a steam trap in accordance with a fourth embodiment of the present invention.

A steam trap in accordance with a first embodiment is illustrated in FIGS. 1 to 4. The steam trap includes a unitary one piece body 2 having a flow passageway therethrough extending between an internally threaded inlet port 4 connectable to a condensate drain line of a steam plant and an internally threaded outlet port 6 connectable to a downstream region of the condensate drain line.

A first chamber 8 defined in the flow passageway within the body 2, communicating with the inlet port 4, houses a removable first strainer 10 for collecting solid contamination which may enter the steam trap. A first removable cap 12 is threaded inserted into the first chamber 8 in an upper face of the body 2 of the steam trap at an upper end of the first chamber 8, whereby the first cap 12 is removable to permit removal and cleaning and/or replacement of the first strainer 10.

A first flow restriction defined by a first venturi nozzle 14 is provided in a second chamber 16 defined in the flow passageway within the body 2, the second chamber 16 communicating with the first chamber 8 and, in the illustrated embodiment, arranged within the body 2 alongside and parallel to the first chamber 8.

The first venturi nozzle 14 incorporates a relatively large orifice when compared to known venturi steam traps, reducing the risk of blockage, and a downstream throat of increased width or increasing cross sectional area. When both live steam and condensate are present in the steam trap, the much denser condensate will be preferentially discharged through the first venturi nozzle 14 and the presence of the relatively high density condensate in the orifice of the first venturi nozzle 14 will stop the much lower density steam from passing through the orifice of the first venturi nozzle 14. In use, a small plug of condensate will be present at the orifice at all times. This minimises any loss of live steam through the nozzle 14.

As condensate is forced through the orifice of the first venturi nozzle 14 it passes from an area of high pressure into a lower pressure region in the expanding throat of the first venturi nozzle 14, on a downstream side of the orifice. Water's capacity to contain energy reduces as pressure reduces and so any excess energy in the condensate, which can no longer be contained due to the pressure drop, instantly evaporates once in the throat. This evaporation is known as flashing, and the instantaneous expansion of the flash steam creates a localised back pressure on the orifice. The pressure on the orifice applied by the flashing therefore depends on the flowrate, meaning the steam trap can self-regulate.

The first venturi nozzle 14 may be defined within a removable insert 18 threaded received within the second chamber 16 to be removable therefrom, accessible via a second removable cap 20 in the upper face of the body 2 of the steam trap at an upper end of the second chamber 16, whereby the second cap 20 is removable to permit removal and cleaning and/or replacement of the first venturi nozzle 14.

While the first venturi nozzle 14 can largely prevent the loss of live steam through the steam trap, the formation of flash steam in the throat of the first venturi nozzle 14 can still lead to the loss of steam from the steam trap, with resulting loss of energy and potential problems in the downstream condensate recovery system. In particular, if steam is allowed to pass into a condensate receiver tank of the condensate recovery system, such tank must be vented, resulting in the loss of energy and loss of water. This problem is solved by providing a second flow restriction, such as defined by a second venturi nozzle 22, in the flow passageway downstream of the first venturi nozzle 14. The provision of the second flow restriction also allows the orifice of the first venturi nozzle 14 to be larger than usual because any steam remaining downstream of the first venturi nozzle 14 is trapped by the second flow restriction and prevented from passing into the downstream condensate drain line.

In the embodiment shown in FIGS. 1 to 4, this second venturi nozzle 22 is provided in a third chamber 24 defined in the flow passageway within the body 2, downstream of the first venturi nozzle 14. In the embodiment shown in FIGS. 1 to 4, the third chamber 24 is arranged in the body 2 parallel to the first and second chambers 8,16. The orifice of the second venturi nozzle 22 may be larger than that of the first venturi nozzle 14 due to the reduced pressure downstream of the first venturi nozzle 14.

As with the first venturi nozzle 14, the second venturi nozzle 22 is defined within a removable insert 26 threaded received within the third chamber 24, accessible via a third removable cap 28 in the upper face of the body 2 of the steam trap at an upper end of the third chamber 24, whereby the third cap 28 is removable to permit removal and cleaning and/or replacement of the second venturi nozzle 22.

The third chamber 24 communicates with the outlet port 6 of the body 2 of the steam trap, downstream of the second venturi nozzle 22.

As best shown in FIG. 1, a second strainer 30 is provided downstream of the first venturi nozzle 14 and upstream of the second venturi nozzle 22. The second strainer is located in a fourth chamber 32 arranged below and substantially aligned with the second chamber 16, downstream of the second chamber 16 and upstream of the third chamber 24. A fourth removable cap 34 is threaded inserted into the fourth chamber 8 in an lower face of the body 2 of the steam trap at a lower end of the fourth chamber 8, whereby the fourth cap 34 is removable to permit removal and cleaning and/or replacement of the second strainer 22.

The steam trap of the first embodiment, as illustrated in FIGS. 1 to 4, is intended to be mounted to a substantially horizontally extending steam line, such that, in use, the longitudinal axis of each of the first and second venturi nozzles 14,22 is aligned vertically.

Figure 19:
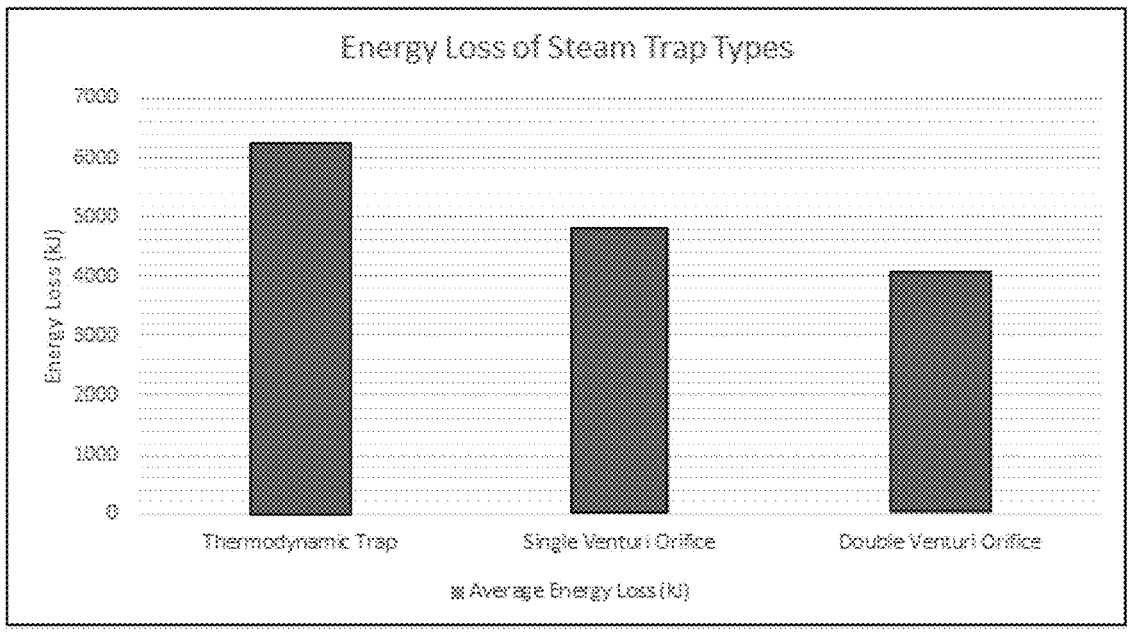
FIG. 19 is a chart depicting measured energy losses (kJ) across a thermodynamic trap, a single venturi orifice, and a double venturi orifice.
Figure 20:
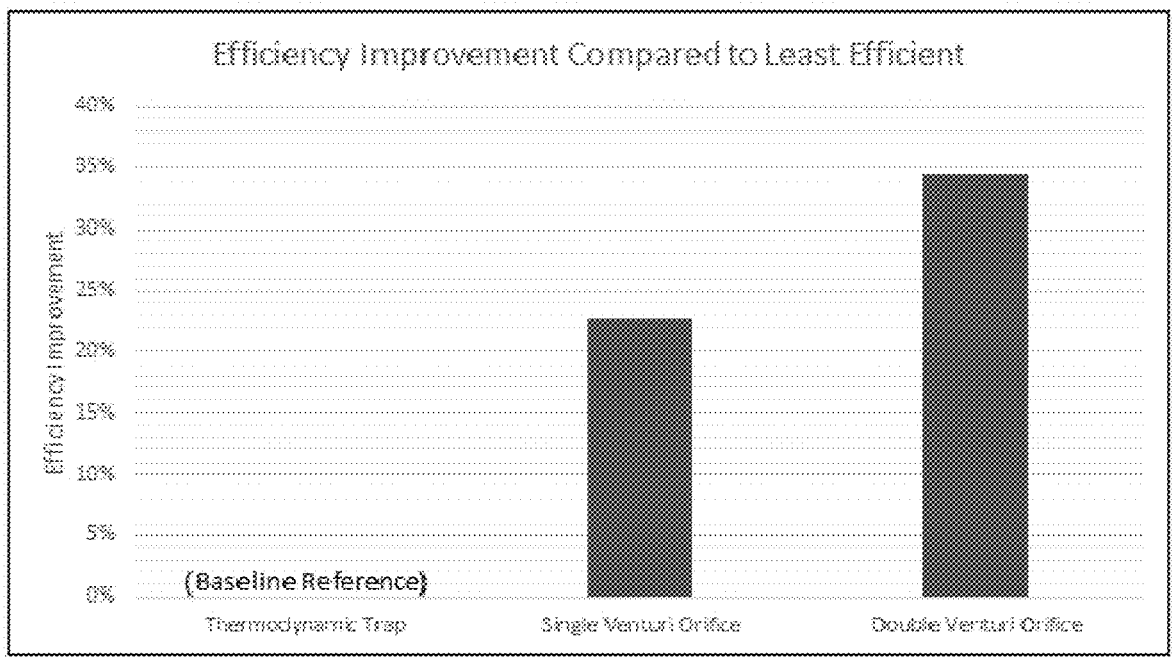
FIG. 20 is a chart depicting calculated efficiency improvements for a single venturi orifice and a double venturi orifice as compared to a thermodynamic trap as a baseline reference.

By providing a staged or cascading pressure drop across two (or more) venturi nozzles arranged in series there is a resultant reduction in the percentage of flash steam produced downstream of the stream trap and introduced in the condensate system, thereby providing a corresponding reduction in energy loss and increase in efficiency, as illustrated in the charts of FIGS. 19 and 20.

For example, for a pressure drop of 1000 kg/hr from 10 bar (145 psi) to atmospheric pressure, 16% flash steam is formed or 160 kg/hr. If the last pressure drop across the last (most downstream) venturi is 1 bar then only 3% flash steam is formed or 30 Kg/hr.

Reducing the percentage of flash steam released to the condensate system in a steam plant through the use of an improved steam trap may have the effects of:
- reducing in water loss and resultant softened water required, less wear and tear on the softener;
- reducing the amount of chemicals used in a boiler water chemical treatment;
- a reduction in the amount of fuel required to be burnt in the boiler to bring fresh makeup water (to replace lost steam) up to steam temp and pressure;
- a reduction in the CO2/NOx and SOx emissions (dependant on the fuel type);
- a reduction in the wear and tear of the condensate system due to less two phase flow existing in the condensate piping etc. downstream of the steam trap.

In a second embodiment, illustrated in FIGS. 5 to 8, wherein like components are identified by like reference numerals, the first strainer 10 is located in a first chamber 8 accessible, in the second embodiment, from a lower side of the body 2 of the steam trap via a threaded cap 12, while both the first and second venturi nozzles 14,22 are located in respective inserts 18,26 mounted in a common chamber 40 in an upper side of the body 2 of the steam trap accessible by a common opening provided in an upper side of the steam trap, the common opening being closed by a removable lid or closure 42 with suitable retaining means, such as a peripheral clamp 44 engaging a flange around the opening of the chamber 40. In such embodiment, the second strainer 30 is removably coupled to an upper portion of the removable insert defining the second venturi nozzle 22.

In a third embodiment, illustrated in FIGS. 9 to 12, the first and second venturi nozzles 14,22 are located in respective removable inserts 18,26 mounted within respective first and second chambers 46,48 forming parts of the flow passageway through the body 2 of the steam trap, the chamber 46,48 being arranged parallel to one another and extending from an upper face of the body 2 of the steam trap, each being capped by a respective removable threaded cap 50,52 inserted into upper ends of the chambers 46,48. The first strainer 10 is located in a receiving chamber 54 located below the first chamber 46 and accessible by a respective removable threaded cap 56 for cleaning of the first strainer 10, the first strainer receiving chamber 54 being arranged in the flow passageway downstream of the inlet port 4 and upstream of the first and second chambers 46,48.

As with the second embodiment, the second strainer 30, downstream of the first venturi nozzle 14 and upstream of the second venturi nozzle 22, is removably coupled to an upper portion of the insert 26 defining the second venturi nozzle 22.

In a steam trap in accordance with a fourth embodiment, as illustrated in FIGS. 13 to 16, the first and second venturi nozzles 14,22 may be arranged orthogonally to one another such that at least one of the venturi nozzles 14,22 is aligned with a vertical axis whether the steam trap is coupled to a horizontally arranged steam line or a vertically arranged steam line. This provides better liquid sealing through the steam trap by virtue of the at least one vertically aligned venturi nozzle.

As illustrated in the embodiment shown in FIGS. 13 to 16, an atomising spray nozzle 58 may be located in the flow passageway downstream of the second venturi nozzle 22 for atomising the condensate passing through and out of the second venturi nozzle 22. Such atomisation of the condensate increases the surface area of the condensate droplets and enhances cooling of the condensate before it passes into the condensate drain line via the outlet port 6 and can prevent erosion of the downstream condensate drain pipework which might otherwise occur should a stream of liquid condensate impinge upon an inner surface of such pipework. In the embodiment shown in FIGS. 13 to 16, the atomising spray nozzle 58 is inserted into the flow passageway via the outlet port 6, downstream of the second venturi nozzle 22, such that the spray nozzle 58 is located within the outlet port 6.

Figure 17:
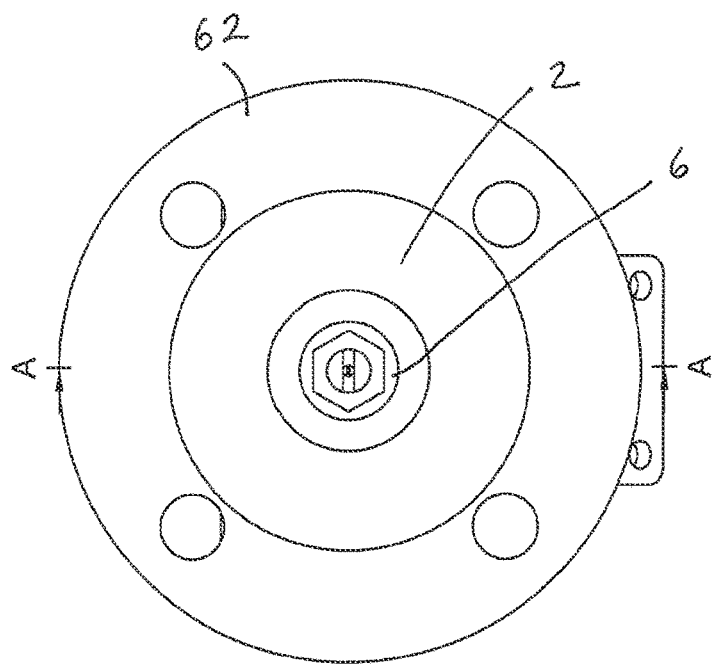
FIG. 17 is an end view of a steam trap in accordance with a fifth embodiment of the present invention.
Figure 18:
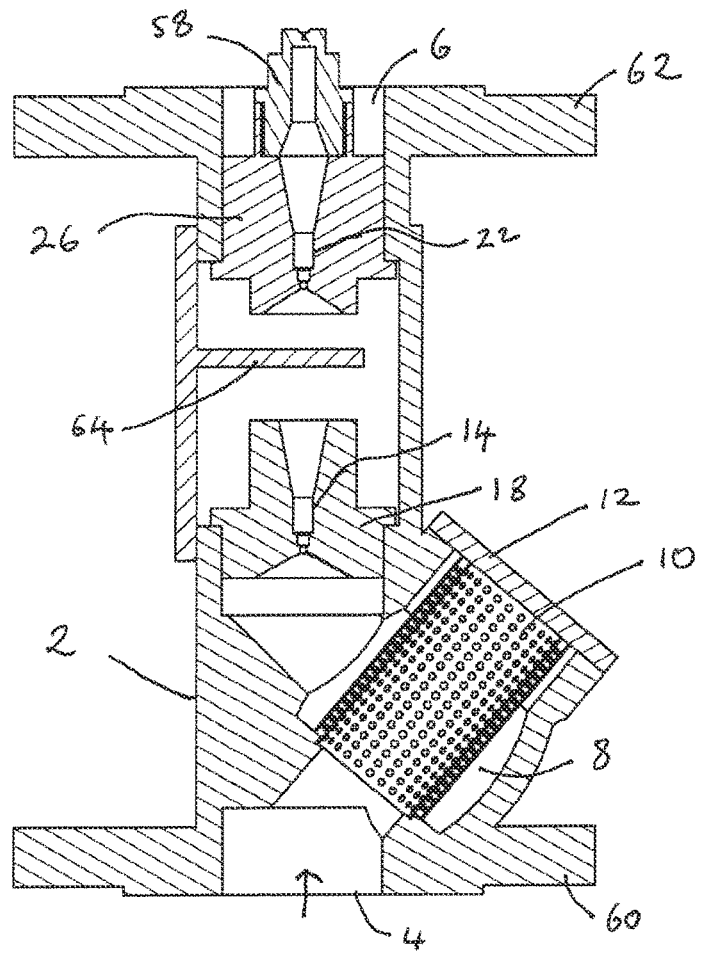
FIG. 18 is a sectional view on line A-A through the steam trap of FIG. 17.

A steam trap in accordance with a fifth embodiment is illustrated in FIGS. 17 and 18. The steam trap of FIGS. 17 and 18 includes a housing 2 incorporating a flow passageway extending between coaxially aligned inlet and outlet ports 4,6 at either end of the housing 2. The inlet and outlet ports 4,6 are associated with respective mounting flanges 60,62 at either end of the housing 2 of the steam trap to allow the steam trap to be mounted inline in a condensate drain line. The housing 2 of the steam trap incorporates first and second venturi nozzles 14,22 defined in respective removable inserts 18,26 arranged coaxially with one another within the passageway of the housing 2 between the inlet and outlet ports 4,6. A transverse wall 64 is provided within the housing extending into the passageway between the first and second venturi nozzles 14,22 to prevent turbulence emanating from an outlet end of the first venturi nozzle 14 from impinging on the inlet end of the second venturi nozzle 22.

At the front of the steam trap, upstream of the first venturi nozzle 14 is mounted a removable strainer 10 within a chamber 8 defined in the flow passageway in the housing 2. The strainer 10 may comprise a double walled strainer having a course mesh first part and a finer mesh second part. A removable cap 12 is provided for accessing the strainer 10 for removal and cleaning.

As shown in FIGS. 17 and 18, an atomising spray nozzle 58 may be located within the outlet port downstream of the second venturi nozzle 22 for atomising the condensate passing through and out of the second venturi nozzle 22, thereby reducing erosion as described above.

It is envisaged that one or more further flow restrictions, with one or more venturi nozzles, may be provided downstream of the second venturi nozzle, if required, to eliminate the passage of live or flash steam into the condensate recovery line coupled to the outlet port of the steam trap. Such additional downstream flow restrictions may be required in steam plants having a particularly high steam pressure. The provision of two or more venturi nozzles arranged in series also allows the orifice size of each venturi nozzle to be larger than the case where on a single venturi nozzle is provided, reducing the risk of blockage, while ensuring that no steam passes into the condensate recovery system.

A non-return valve may be provided in the flow passageway, in or adjacent the inlet port, outlet port, or at any point in the flow passageway, for preventing condensate from being sucked back into the steam trap from the condensate recovery line during shut down of the steam plant, which may create a partial vacuum in the steam trap and/or steam line to which the inlet port of the steam trap is coupled.

The invention is not limited to the embodiments described herein but can be amended or modified without departing from the scope of the present invention as defined in the appended claims as interpreted according to the principles of patent law including the doctrine of equivalents.

The invention claimed is:

1. A steam trap comprising:
a body having a flow passageway therethrough, said flow passageway extending between an inlet connectable to a steam pipeline and an outlet connectable to a condensate drain line, said flow passageway comprising:
a first flow restriction defined by a first venturi orifice configured to pass condensate therethrough while restricting a flow of live steam; and
a second flow restriction, downstream of said first flow restriction, said second flow restriction defining a second venturi orifice configured to allow condensate flow therethrough while restricting a flow of flash steam;
wherein said first and second venturi orifices are arranged orthogonally to one another and said first and second venturi orifices are arranged in series.

2. The steam trap of claim 1, wherein said second venturi orifice has a different orifice size than said first venturi orifice.

3. The steam trap of claim 1, wherein said first and second flow restrictions are defined in removable inserts adapted to be removed from said body of said steam trap for cleaning and/or replacement.

4. The steam trap of claim 3, wherein said body includes one or more removable caps or covers permitting access to the respective first and second flow restrictions to permit removal thereof.

5. The steam trap of claim 1, further comprising a first strainer in said flow passageway, upstream of said first flow restriction, for removing solid contamination from the steam.

6. The steam trap of claim 5, further comprising a second strainer in said flow passageway downstream of said first flow restriction and upstream of said second flow restriction.

7. The steam trap of claim 6, wherein said first strainer and/or said second strainer is removable from said body of said steam trap.

8. The steam trap of claim 7, wherein said body includes one or more removable caps permitting access to the respective first and second strainers to permit removal thereof.

9. The steam trap of claim 1, further comprising a spray nozzle in said flow passageway, downstream of said second flow restriction, for atomising condensate passing therethrough.

10. The steam trap of claim 9, wherein said spray nozzle is positioned in or adjacent said outlet of said flow passageway.

11. The steam trap of claim 1, wherein one or more further flow restrictions are provided in said flow passageway downstream of said second flow restriction.

12. The steam trap of claim 11, wherein said one or more further flow restrictions comprise one or more venturi orifices.

* * * * *